United States Patent
Nishiyama

(10) Patent No.: US 7,840,724 B2
(45) Date of Patent: Nov. 23, 2010

(54) IMAGE PROCESSING APPARATUS, IMAGE PROCESSING METHOD, AND IMAGE PROCESSING PROGRAM

(75) Inventor: Jun Nishiyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 232 days.

(21) Appl. No.: 12/139,434

(22) Filed: Jun. 13, 2008

(65) Prior Publication Data
US 2008/0309658 A1 Dec. 18, 2008

(30) Foreign Application Priority Data
Jun. 14, 2007 (JP) ............... 2007-157744

(51) Int. Cl.
*G06F 3/00* (2006.01)
*G06F 13/00* (2006.01)

(52) U.S. Cl. .................. 710/52; 710/2; 710/8; 710/15

(58) Field of Classification Search ................. None
See application file for complete search history.

(56) References Cited

U.S. PATENT DOCUMENTS

| 6,441,827 | B1 | 8/2002 | Hori et al. |
| 2007/0081189 | A1 | 4/2007 | Kamei et al. |

| 2008/0162931 | A1* | 7/2008 | Lord et al. ................. 713/165 |

FOREIGN PATENT DOCUMENTS

| JP | 09-200361 A | 7/1997 |
| JP | 09-233086 A | 9/1997 |
| JP | 2000-020742 A | 1/2000 |
| JP | 2000-196874 A | 7/2000 |
| JP | 2003-241738 A | 8/2003 |
| JP | 2005-49972 A | 2/2005 |
| JP | 2006-148449 A | 6/2006 |
| JP | 2007-104491 A | 4/2007 |

OTHER PUBLICATIONS

Office Action issued in corresponding Japanese Patent Application 2007-157744 dated Jun. 29, 2009.

* cited by examiner

*Primary Examiner*—Tariq R. Hafiz
*Assistant Examiner*—Scott Sun
(74) *Attorney, Agent, or Firm*—Rossi, Kimms & McDowell LLP

(57) ABSTRACT

Object data representing an image object extracted from image data is stored. A display unit displays the image object or the contour of the image object in accordance with the display mode designated by a user.

7 Claims, 10 Drawing Sheets

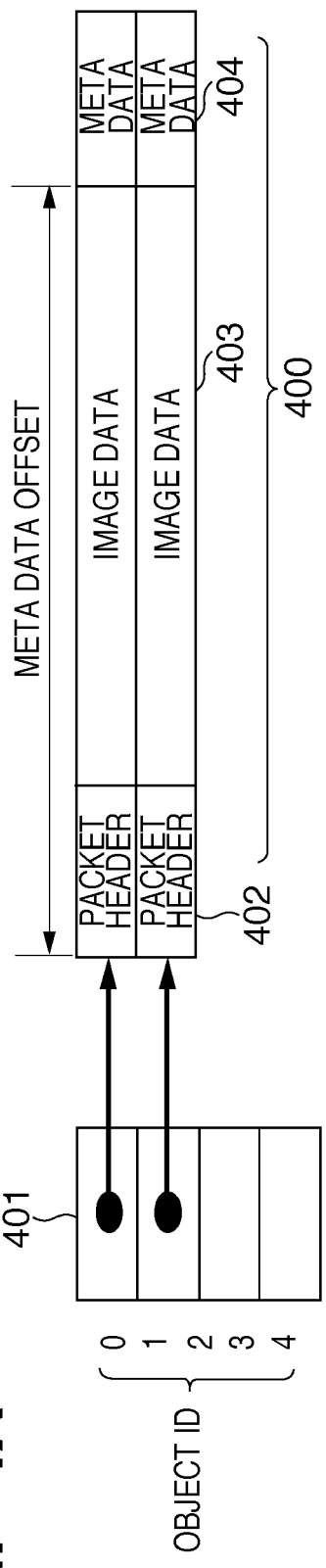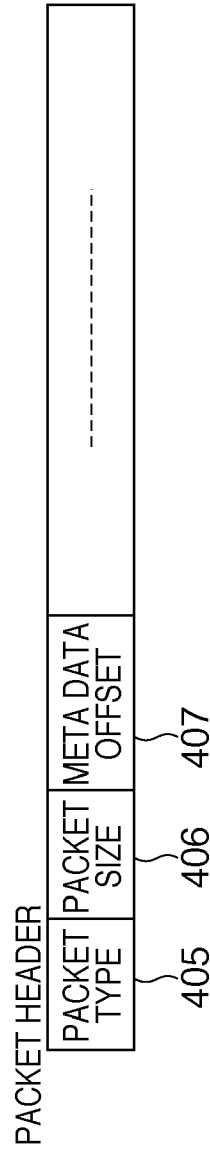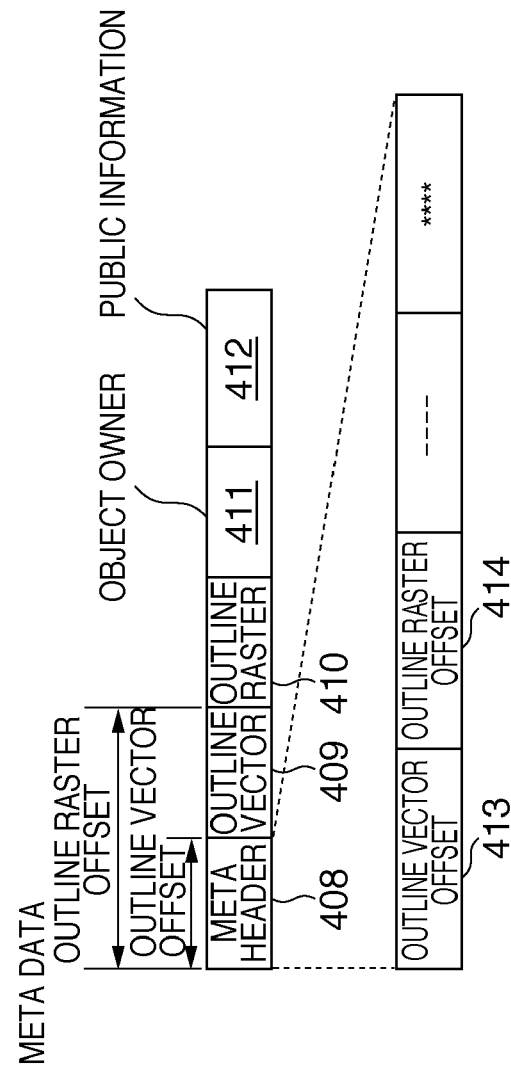
FIG. 4A
FIG. 4B
FIG. 4C

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image forming apparatus which inputs image data from which an image object is to be extracted, stores object data representing an image object, and outputs the object data.

2. Description of the Related Art

Recently, a multifunction type image forming apparatus which has a combination of a printer function, a scanner function, and the like has been widely used. Such an image forming apparatus can, for example, scan a sheet drawing, recognize a geometric model included in the drawing, and store the resultant data as a database.

In addition, in the recent years, wireless communication means which are connected via a network have been popularized, and digital image data communication has been widely performed in a network including terminals having different display abilities, for example, a computer including a database, and a wireless portable terminal. For example, the technique disclosed in Japanese Patent Laid-Open No. 2003-241738 has been developed to allow proper display of digital image data on the display screens of terminals even in a network including terminals having different display abilities.

Consider, for example, an intranet in which a plurality of users reuse objects stored in a database by using an image forming apparatus, and generate new objects. In this case, the display abilities of terminals are almost the same. In such a case, the speeding up of browsing objects by users becomes the primary issue. In general, when a plurality of objects stored in a database are displayed in the form of a list, as the number of objects increases, the reaction time of display becomes longer, resulting in deterioration of user convenience. In addition, in some cases, a given user wants to inhibit other users from reusing a new object generated by the given user without permission.

Even in such a case, it is preferable to allow the use of objects by a simple method if there is an agreement between users. Japanese Patent Laid-Open No. 2005-49972 discloses a multifunction image forming apparatus which can quickly search for the information of a desired document from accumulated documents by using a frequency of use. This multifunction image forming apparatus allows a quick search by displaying document names and the like in descending order of frequency of use and making a user select a document. In addition, the safety of a system can be improved by performing authentication using biometric information such as speech, fingerprints, and irises as well as user codes such as IDs.

According to patent Japanese Patent Laid-Open No. 2005-49972, the reaction time until many documents are displayed on a display unit does not become the primary issue. Furthermore, this technique requires a hardware device for recognizing biometric information, and complicated setting for the authentication of documents and de-authentication.

SUMMARY OF THE INVENTION

The present invention provides an image processing apparatus which can quickly display a plurality of objects in the form of a list and can easily set and cancel confidentiality of an object, and an image forming apparatus including the image processing apparatus.

The present invention in its first aspect provides an image processing apparatus comprising: a storage which stores object data representing an image object extracted from image data; and a display controller which causes a display unit to display one of the image object and a contour of the image object in accordance with a designated display mode on the basis of the object data stored in the storage.

The present invention in its second aspect provides an image processing method comprising: a storage step of storing object data representing an image object extracted from image data; and a display control step of causing a display unit to display one of the image object and a contour of the image object in accordance with a designated display mode on the basis of the object data stored in the storage step.

The present invention in its third aspect provides a computer-readable medium storing an image processing program which causes a computer to function to cause a display unit to display one of the image object and a contour of the image object in accordance with a designated display mode on the basis of object data representing an image object extracted from image data and stored in a storage which stores the object data.

According to the present invention, a plurality of objects can be quickly displayed in the form of a list, and the confidentiality of an object can be easily set and canceled.

Further features of the present invention will become apparent from the following description of exemplary embodiments with reference to the attached drawings.

BRIEF DESCRIPTION OF THE DRAWINGS

FIGS. 4A to 4C are views showing the structure of packet data according to this embodiment;

DESCRIPTION OF THE EMBODIMENTS

Figure 1:
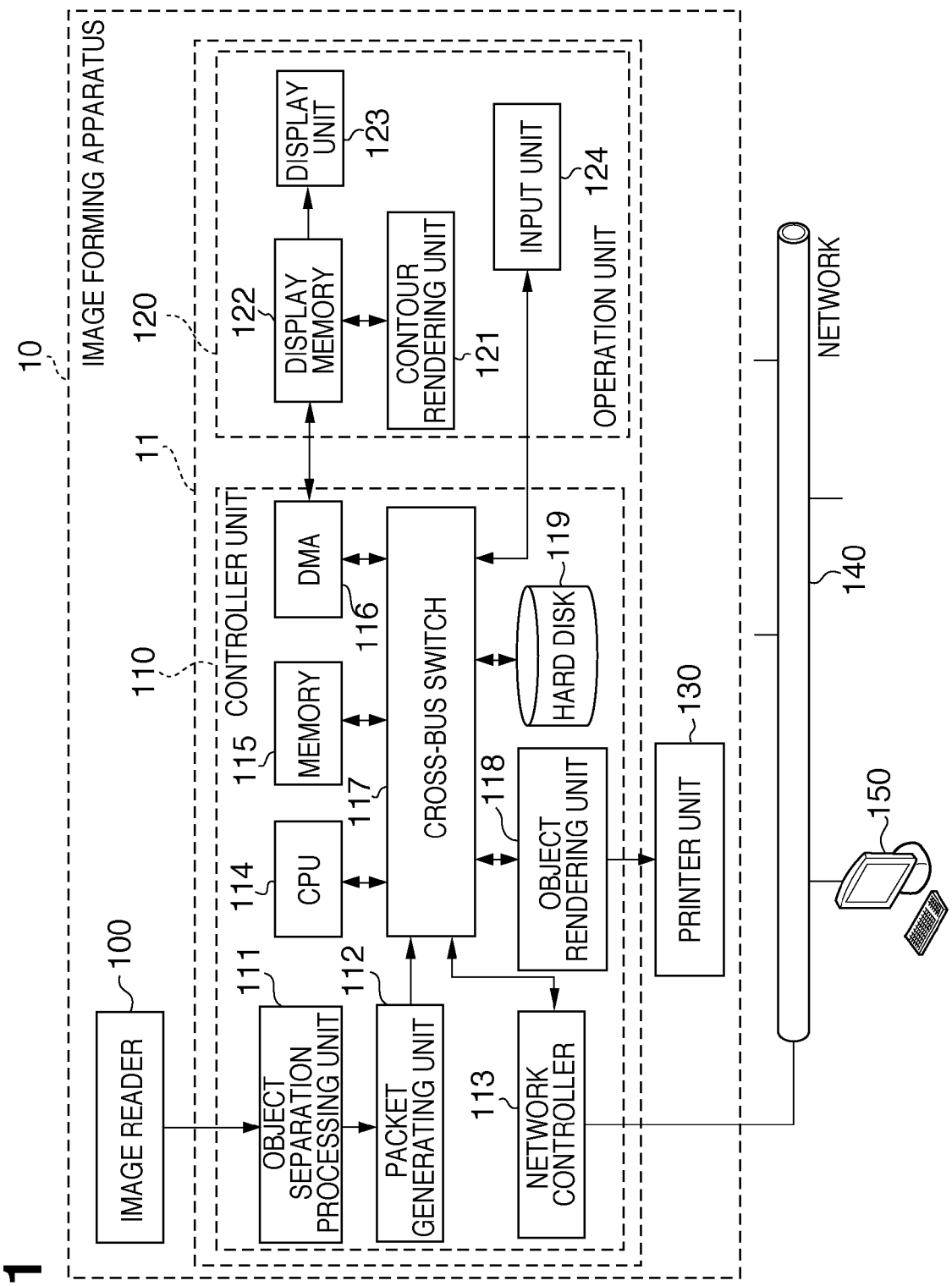
FIG. 1 is a block diagram showing the arrangements of an image processing apparatus and image forming apparatus according to an embodiment of the present invention.

The best mode for carrying out the present invention will be described in detail below with reference to the accompanying drawings. The same reference numerals denote the same constituent elements, and a repetitive description will be omitted.

FIG. 1 is a block diagram showing the arrangements of an image processing apparatus and image forming apparatus according to an embodiment of the present invention. As shown in FIG. 1, an image forming apparatus 10 includes an image reader 100, a controller unit 110, an operation unit 120, and a printer unit 130. The image reader 100 includes an image input unit for inputting image data from which an object is to be extracted. For example, a sheet document is optically read by a scanner and converted into electronic data. In general, an optically read sheet document is converted into RGB data or contone data with each color comprising 8 bits. The operation unit 120 includes a contour rendering unit 121, a display memory 122, a display unit 123, and an input unit 124. A user of the image forming apparatus 10 can give an instruction to, for example, display objects in the form of a list by using the input unit 124. The display unit 123 allows the user to browse objects displayed in the form of a list. The contour rendering unit 121 and the display memory 122 will be described later.

The printer unit 130 (output unit) can, for example, print image data desired by the user. The controller unit 110 includes a network controller 113, a CPU 114, a memory 115, a DMA 116, a cross-bus switch 117, and a hard disk 119. The image forming apparatus 10 often includes many functions requiring real time performance such as a scanner function and a printer function. In general, forming the cross-bus switch 117 will shorten the wait time of each function unit when data communication is performed between arbitrary function units.

The memory 115 functions as the main memory of the CPU 114. The DMA 116 causes the display unit 123 to display object data stored in the hard disk 119. Referring to FIG. 1, the DMA 116 implements a DMA (Direct Memory Access) function of transferring data in the hard disk 119 to the display unit 123 without via the CPU 114. The network controller 113 has the function of an interface for connection to an external network 140.

The controller unit 110 further includes an object separation processing unit 111, a packet generating unit 112, the network controller 113, and an object rendering unit 118. The controller unit 110 controls the image reader 100 and the printer unit 130. The controller unit 110 controls the operation unit 120 via the cross-bus switch 117. The combination of the controller unit 110 and the operation unit 120 in FIG. 1 will also be referred to as an image processing apparatus 11.

Figure 2:
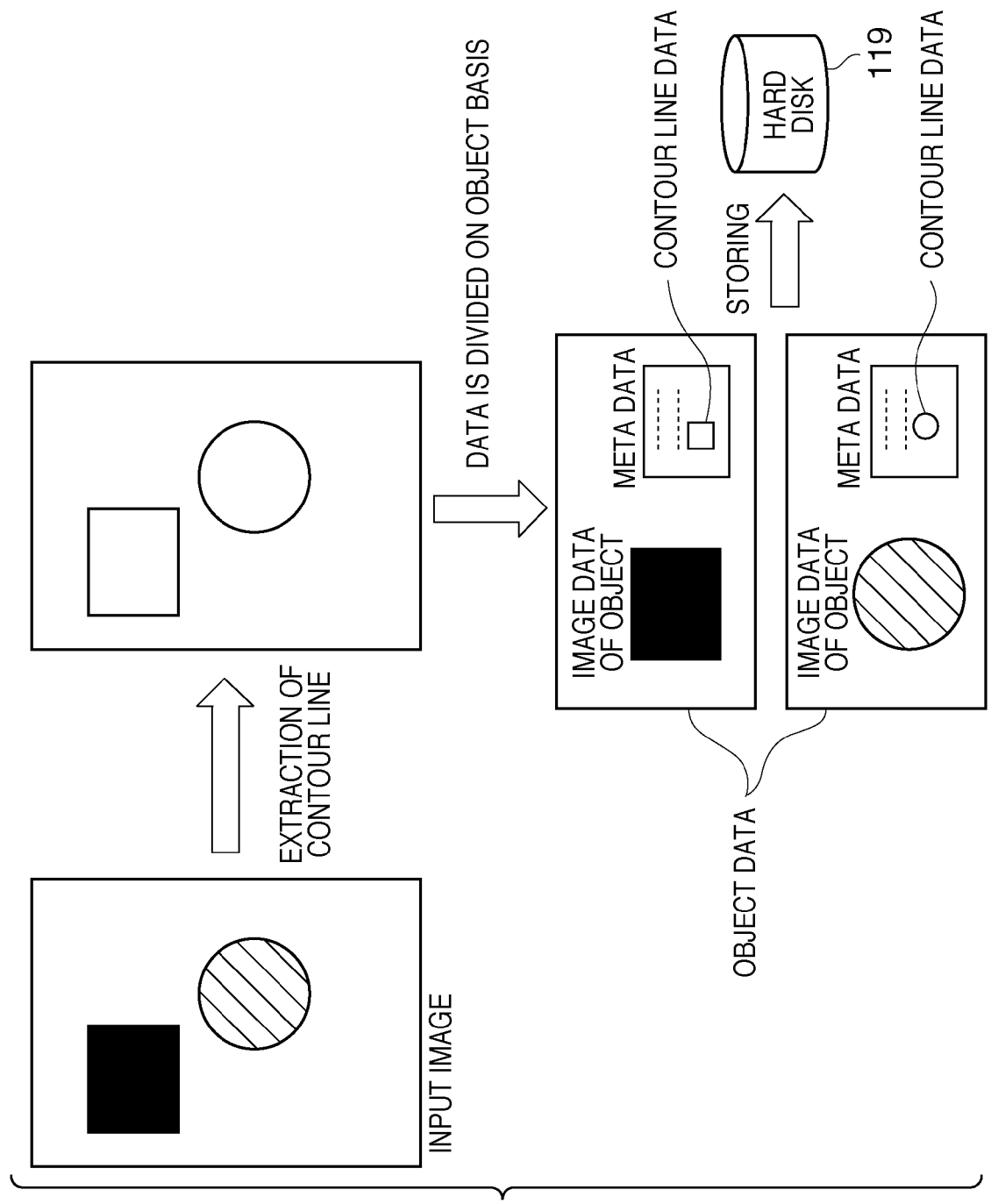
FIG. 2 is a view for explaining the concept of generating object data.

The operation of the image forming apparatus 10 when a sheet document is read by the image reader 100 will be described next with reference to FIGS. 1 and 2. FIG. 2 is a view for explaining the concept of generating object data. Assume that an input image input to the image reader 100, that is, a sheet document, includes a solid filled rectangular geometric model (to be referred to as an object hereinafter) and a hatched circular geometric model, as shown in FIG. 2. When the input image shown in FIG. 2 is input to the image reader 100 by a scanning function or the like, the image reader 100 optically reads the input image and converts it into electronic data. The converted electronic data is transmitted to the object separation processing unit 111 in the controller unit 110 via a dedicated interface.

The object separation processing unit 111 recognizes the objects included in the electronic data generated by the image reader 100, and divides the electronic data for each object. At this time, the object separation processing unit 111 extracts the contour line of each of the recognized objects. For example, referring to FIG. 2, the object separation processing unit 111 extracts a rectangle and a circle which are the contour lines of the rectangular and circular objects. The image data of the respective objects and the contour line data representing the extracted contour lines are transmitted to the packet generating unit 112. The packet generating unit 112 generates object data by compiling information about the objects using the image data and contour line data of the objects. In this embodiment, object data is generated as packet data having predetermined fields. As shown in FIG. 2, the packet data, that is, the object data, contain the image data and contour line data of the objects and meta data including other information about the objects. The packet data generated by the packet generating unit 112 on an object basis are stored in the hard disk 119 via the cross-bus switch 117.

Figure 3:
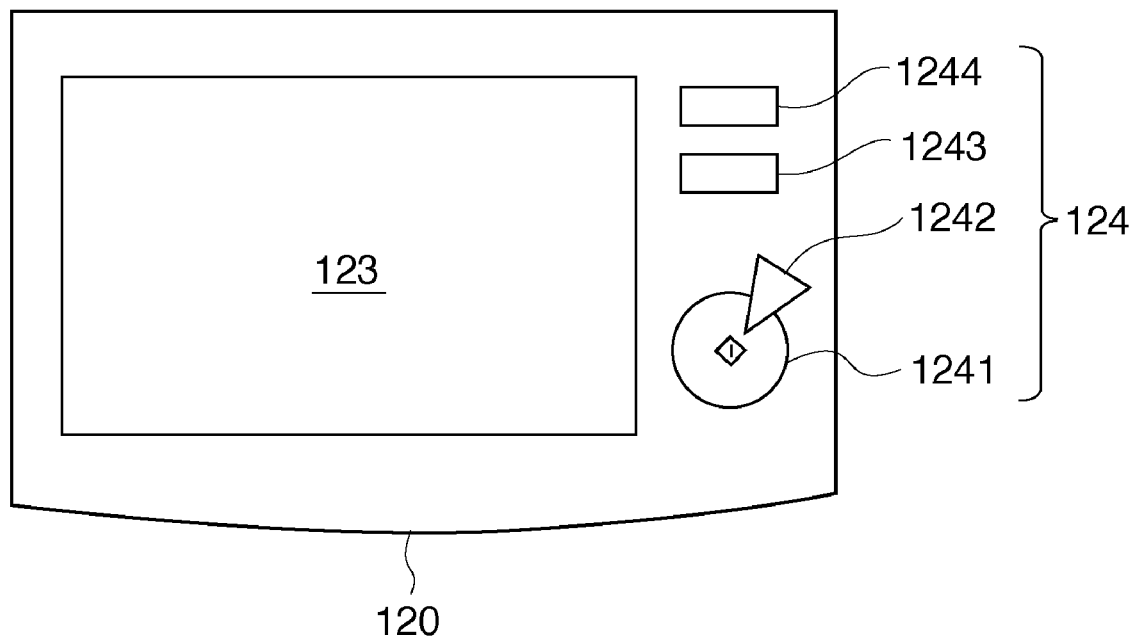
FIG. 3 is a view showing an example of the layout of an operation unit as a user interface.

FIG. 3 is a view showing an example of the layout of the operation unit 120 as a user interface. In this embodiment, a touch panel sheet is pasted on the surface of the display unit 123. By touching a designated portion on the display unit 123, the user can supply the corresponding instruction to the image forming apparatus 10. As shown in FIG. 3, the input unit 124 includes a start key 1241, a stop key 1242, and LED displays 1243 and 1244. The start key 1241, for example, is used to start image reading operation by the image reader 100. The user can stop such operation by pressing the stop key 1242. The LED displays 1243 and 1244 show the state of the start key 1241. For example, these displays can show that the start key 1241 can be used or cannot be used. Alternatively, the LED displays can show that the operation of the scanning function, the printing function, or the like is started.

FIGS. 4A to 4C are views showing the arrangement of packet data according to this embodiment. As has been described above, the image reader 100 converts a sheet document into electronic data. The packet generating unit 112 generates packet data for each object contained in the electronic data. Such a plurality of packet data are respectively provided with object IDs and stored in the hard disk 119 in the form of a table.

FIG. 4A is a view schematically showing an object table 401 containing the packet data provided with object IDs "0" to "4". Each packet data 400 contains a packet header 402, image data 403, and meta data 404. The packet header 402 stores information such as the size of the packet data 400. The image data 403 stores image data representing object data. The meta data 404 stores the contour line data of an object and the like.

FIG. 4B is a view showing the arrangement of the packet header 402. As shown in FIG. 4B, the packet header 402 contains fields 405, 406, and 407. The field 405 stores information indicating the type of packet data 400. The field 405 may store an object ID for identifying the packet data 400. The field 406 stores information indicating the overall size of the packet data 400. The field 407 stores a meta data offset indicating the size between the start address of the packet data 400 and the start address of the meta data 404. The start address of meta data is calculated by start address of meta data=start address of packet data+meta data offset (1)

FIG. 4C is a view showing the arrangement of meta data. As shown in FIG. 4C, the meta data 404 contains a meta header 408 and fields 409, 410, 411, and 412. The meta header 408 stores information indicating the overall size of the meta data 404. The fields 409 and 410 store the contour line data of an object. The field 411 stores object owner information such as the name of a user who owns an object. The field 412 stores public information representing the range in which an object is disclosed to the public when it is displayed on the display unit 123. The details of the fields 411 and 412 will be described later. Both the fields 409 and 410 store contour line data of an object.

In this embodiment, the contour line data of an object can be stored by using two types of data, namely vector data and raster data. Vector data is data obtained by, for example, making the contour line of an object overlap grid lines at arbitrary intervals and obtaining the coordinates of the intersections between the grid lines and the contour line of the object. Raster data is data acquired as an aggregate of pixel information. These two types of data are known as data digitally representing an image.

When the contour line of an object is acquired as vector data, the vector data is stored in the field 409. When the contour line of the object is acquired as raster data, the raster data is stored in the field 410. In the following description, the data stored in the fields 409 and 410 will be referred to as "outline vector data" and "outline raster data", respectively.

As shown in FIG. 4C, the meta header 408 contains fields 413 and 414. The field 413 stores an "outline vector offset" indicating the size between the start address of meta data and the start address of the field 409 storing outline vector data. The field 414 stores an "outline raster offset" indicating the size between the start address of meta data and the start address of the field 410 storing outline raster data. The start addresses of the fields 409 and 410 are calculated by start address of field 409=start address of packet data+ meta data offset+outline vector offset (2)

start address of field 410=start address of packet data+ meta data offset+outline raster offset (3)

The object table 401 further stores the correspondence between object IDs and the start addresses of the packet data 400 corresponding to the respective object IDs. For example, a start address corresponding to object ID "3" can be stored as pointer information from the start address of packet data corresponding to object ID "0". Therefore, the start addresses of the fields 409 and 410 of the packet data 400 identified by a desired object ID contained in the object table 401 are calculated by start address of field 409=object table [x]+meta data offset+outline vector offset (4)

start address of field 410=object table [x]+meta data offset+outline raster offset (5)

In equations (4) and (5), the object table [x] indicates the start address of the packet data 400 identified by a desired object ID.

As described above, in this embodiment, a sheet document is read by the image reader 100, and a plurality of packet data generated on an object basis are stored as the object table 401 in the hard disk 119 (an example of a storage). In addition, the contour line data of a desired object can be referred to from the object table 401 by equation (4) or (5).

A sequence by which a user prints object data stored in the hard disk 119 will be described next. First of all, the user selects a desired object, page layout, or the like by using the operation unit 120 shown in FIG. 3. When, for example, the user selects a desired object and page layout, the object rendering unit 118 shown in FIG. 1 reads out the selected object from the hard disk 119. The object rendering unit 118 renders an object while adjusting a resolution, a rotational angle, and the like in accordance with the page layout designated by the user. The object rendering unit 118 also overlaps the rendered object to generate a raster image. The raster image generated by the object rendering unit 118 is output to the printer unit 130 and printed.

Figure 5:
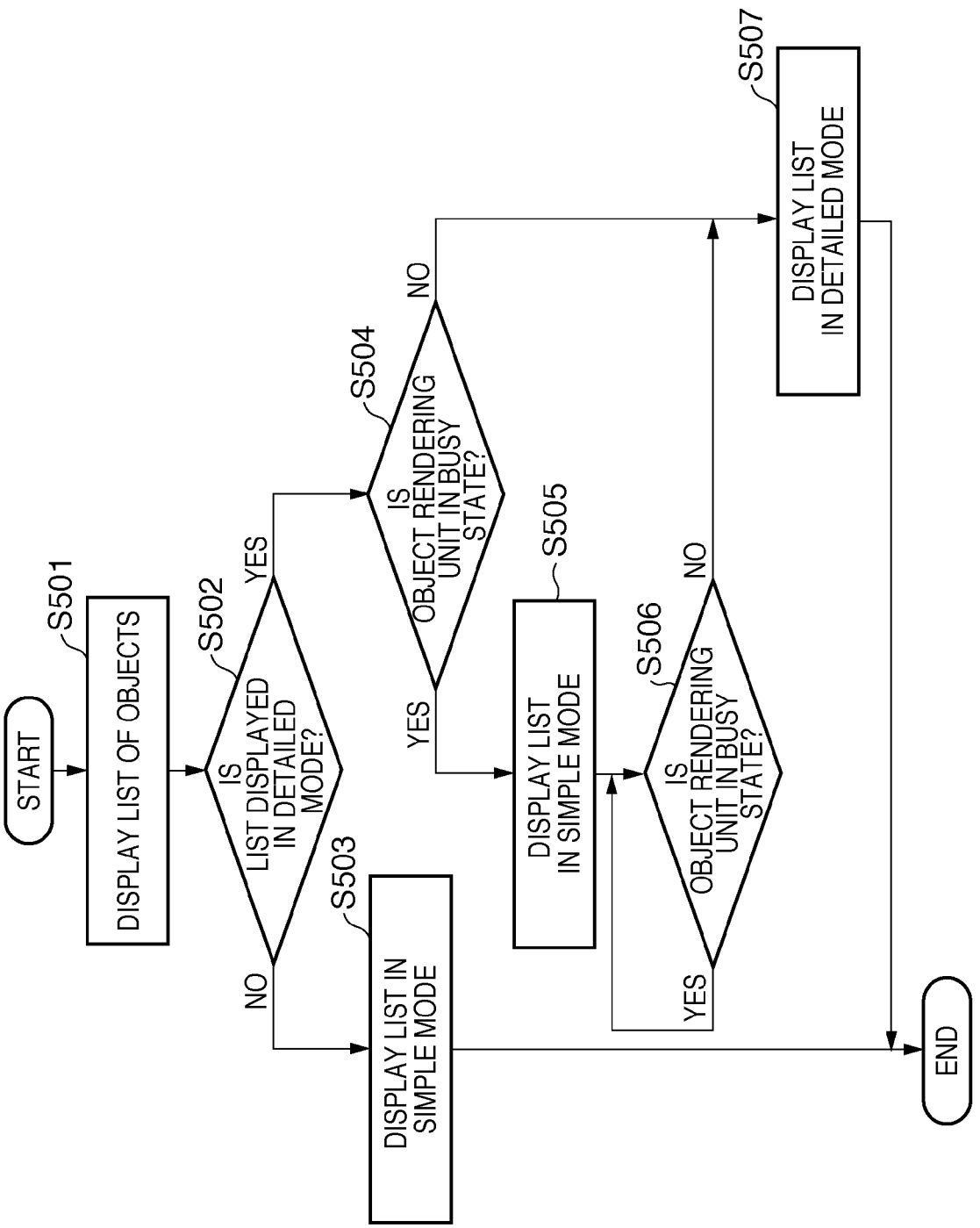
FIG. 5 is a flowchart showing a processing sequence for displaying objects in the form of a list according to this embodiment.
Figure 6A:
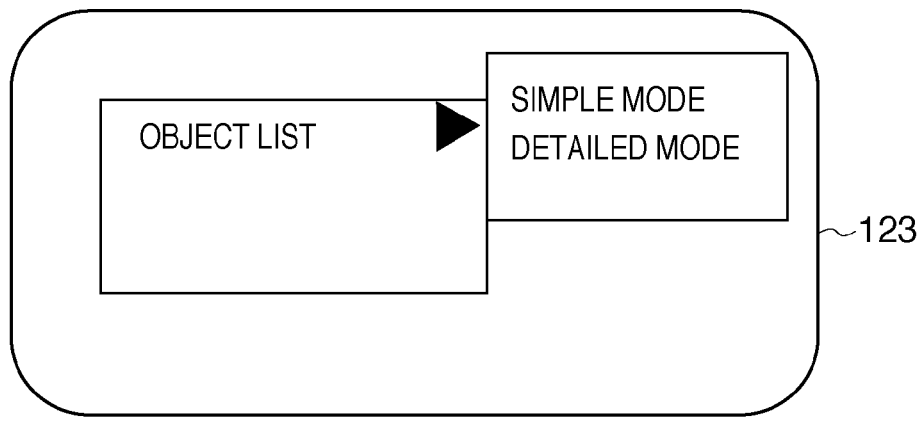
FIGS. 6A to 6C are views each showing an example of a menu window displayed on a display unit.

Operation to be performed to display a plurality of objects stored in the hard disk 119 on the display unit 123 in the form of a list will be described next with reference to FIG. 5. FIG. 5 is a flowchart showing a processing sequence for displaying objects in the form of a list. In step S501, the user operates the input unit 124 to display a menu for displaying a list of objects on the display unit 123. FIG. 6A is a view showing an example of a menu window displayed on the display unit 123.

In step S502, the user selects whether to display a list of objects in the simple mode or the detailed mode. That is, the user can select a display mode in which a list of objects is displayed. If, for example, the user selects the menu "display of object list", as shown in FIG. 6A, it suffices to display a submenu which allows the user to select "simple mode" or "detailed mode". If the user selects "simple mode" in step S502, the DMA 116 refers to the object table stored in the hard disk 119. For example, the DMA 116 refers to the meta data offset stored in the packet header 402 identified by object ID "0" in the object table. The DMA 116 calculates the start address of the meta data 404 by equation (1), and refers to the outline vector offset stored in the field 413 in the meta header 408.

The DMA 116 reads out outline vector data from the field 409 contained in the meta data 404 by equation (5) and stores the data in the display memory 122.

The DMA 116 refers to the meta data offset stored in the packet header 402 identified by object ID "1" and repeats the above processing.

As a result, the DMA 116 reads out outline vector data corresponding to object ID "1" and stores it in the display memory 122.

Figure 6B:
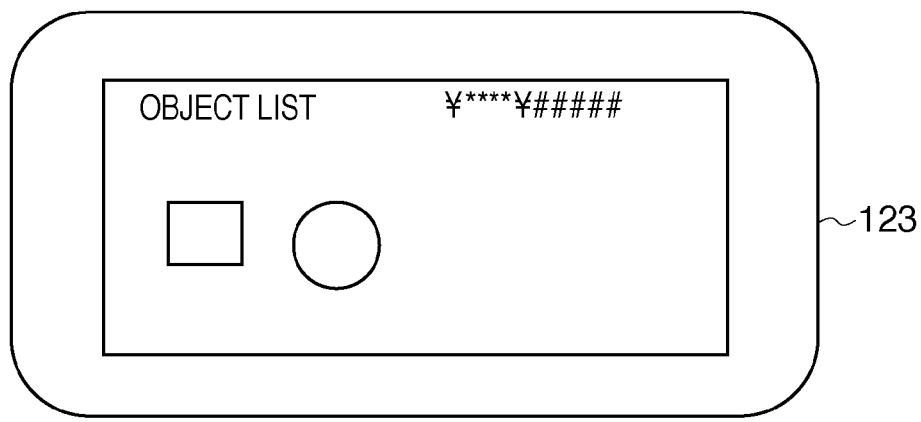

The contour rendering unit 121 converts outline vector data corresponding to all the outline vector data stored in the display memory 122 into raster data having a resolution suitable for the display unit 123. In step S503, the converted raster data is displayed on the display unit 123. In step S503, since the data is displayed in the simple mode, the rectangular and circular objects are displayed as a rectangle and a circle, respectively, which are contour lines, as shown in FIG. 6B.

When the user selects "detailed mode", the CPU 114 detects in step S504 in accordance with a busy signal which is not shown in the accompanying drawings whether the object rendering unit 118 is in the busy state. A case in which the object rendering unit 118 is in the busy state will be described below.

The busy state is a state in which the object rendering unit 118 is performing rendering operation by using an object stored in the hard disk 119 or is generating a raster image.

Figure 6C:
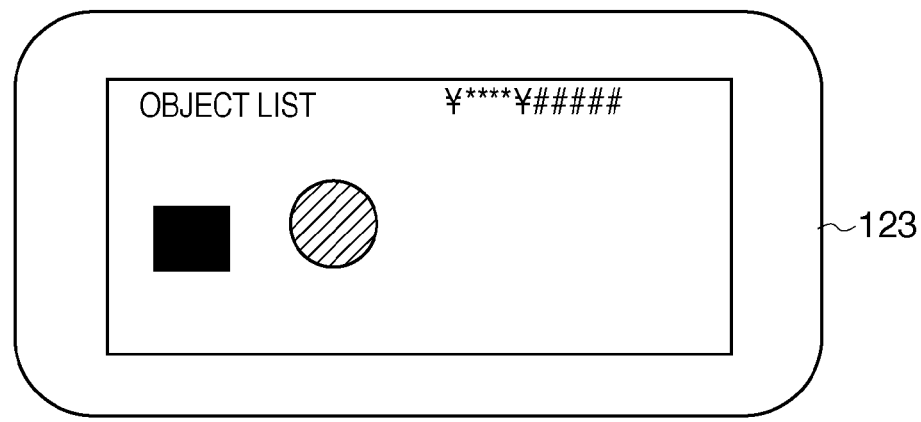

If the CPU 114 detects in step S504 that the object rendering unit 118 is not in the busy state, the CPU 114 reads out the image data of the packet data 400 corresponding to all the objects to the object rendering unit 118. In this case, in order to refer to image data of the packet data 400, for example, the header size of the packet header 402 may be stored in part of the field 406. In addition, the object rendering unit 118 converts the object data of the packet data 400 corresponding to all the objects into raster data having a resolution suitable for the display unit 123. In step S507, the converted raster data is displayed on the display unit 123 via the cross-bus switch 117 and the display memory 122. In step S507, since the objects are displayed in the detailed mode, the objects are displayed as rectangular and circular objects, as shown in FIG. 6C.

If the CPU 114 detects in step S504 that the object rendering unit 118 is in the busy state, the objects are temporarily displayed in the form of a list in the simple mode in step S505. The processing in step S505 is the same as that in steps S502 and S503. In this case, for example, it suffices to display the message "An object is currently used, and a list of objects is displayed in the simple mode" on the display unit 123. In step S506, the CPU 114 periodically monitors a busy signal and repeats the same determination as that in step S504. If the CPU 114 detects in step S506 that the object rendering unit 118 is not in the busy state, the object rendering unit 118 converts the image data of the packet data 400 to be displayed in the form of a list into raster data.

In step S507, the converted raster data is displayed on the display unit 123 via the cross-bus switch 117 and the display memory 122. In this case, the display unit 123 turns off the message "An object is currently used, and a list of objects is displayed in the simple mode".

If the CPU 114 detects in step S504 that the object rendering unit 118 is in the busy state, it suffices to display, for example, the message "An object is currently used. Do you want to display a list of objects in the simple mode?" on the display unit 123. In this case, when the user inputs an instruction not to display a list of objects, the CPU 114 may terminate the processing shown in FIG. 5 without displaying a list of objects in the simple mode or the detailed mode.

In this embodiment, the objects stored in the hard disk 119 are displayed on the display unit 123 of the image forming apparatus 10. However, such objects can be displayed on the display unit of a terminal 150 connected to the external network 140. In this case, the raster data generated by the contour rendering unit 121 and the object rendering unit 118 is transmitted to the terminal 150 via the network controller 113 and the network 140 and displayed on the display unit of the terminal 150.

As described above, the image forming apparatus 10 according to this embodiment includes the object display controller which has the mode of displaying only the contour line of an object in addition to the mode of displaying object images and displays objects in one of the modes which is designated by the user. The reaction time of a display window for displaying a list of objects formed by only contour lines is much shorter than that of a display window for displaying entities of objects. This can greatly improve user convenience when many objects are displayed in the form of a list. In addition, even if objects are displayed in the form of a list in the simple mode, since the contour lines of the objects are displayed, the user can know which objects are registered as a list.

A sequence by which a user sets the disclosure range of an object with respect to other users will be described next. In this embodiment, when objects are stored in the hard disk 119, it is possible to designate the range in which users can browse the object. In the following description, a user who sets a disclosure range for an object will be referred to as an object owner.

Figure 7A:
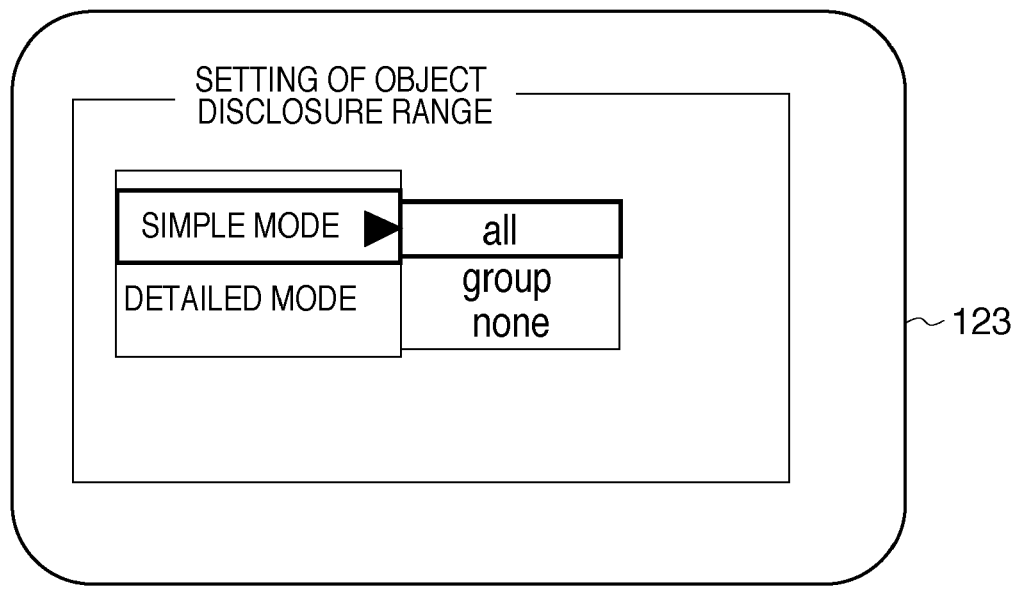
FIGS. 7A and 7B are views each showing an example of a window for allowing an object owner to set the disclosure range of the object.
Figure 7B:
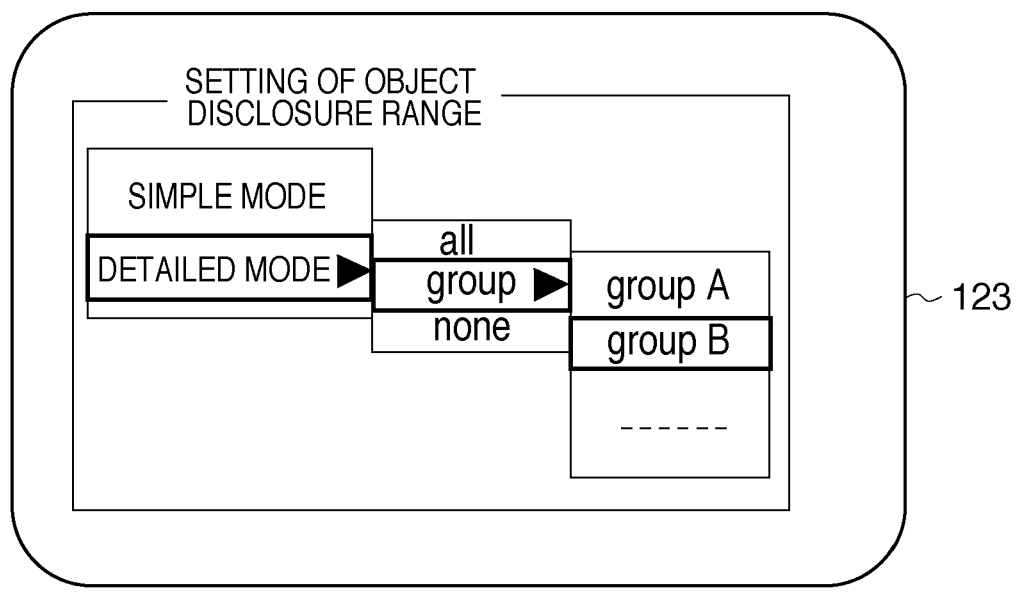

FIGS. 7A and 7B are views each showing an example of a window for allowing an object owner to set the disclosure range of an object. When storing an object in the hard disk 119, the object owner selects the item "setting of disclosure range of object" from the command menu displayed on the display unit 123. The display unit 123 displays a window like that shown in FIG. 7A. As shown in FIG. 7A, this embodiment allows the user to individually set disclosure ranges when objects are browsed by other users in the simple mode and when the objects are browsed by other users in the detailed mode. Referring to FIG. 7A, the object owner selects the simple mode on the menu. When the simple mode is selected, a submenu is open. The object owner can further set the disclosure range of an object in the simple mode on the submenu. Referring to FIG. 7A, the user has selected "all". This permits all the users whose user IDs have been registered in the image forming apparatus 10 to browse the object set by the object owner in the simple mode.

Referring to FIG. 7B, the object owner has selected the detailed mode on the menu. When the detailed mode is selected, a submenu is open. The object owner can further set the disclosure range of an object in the detailed mode on the submenu. Referring to FIG. 7B, the object owner has selected, for example, "group" and "group B" as group information. This permits only the users belonging to the group represented by "group B" to browse the object set by the object owner in the detailed mode.

As described above, when the object owner sets the disclosure range of an object, the CPU 114 acquires the setting information from the operation unit 120 and transmits it to the packet generating unit 112.

The packet generating unit 112 stores the user ID of the object owner in the field 411 shown in FIG. 4C, and stores the information of the disclosure range in the field 412.

Figure 8:
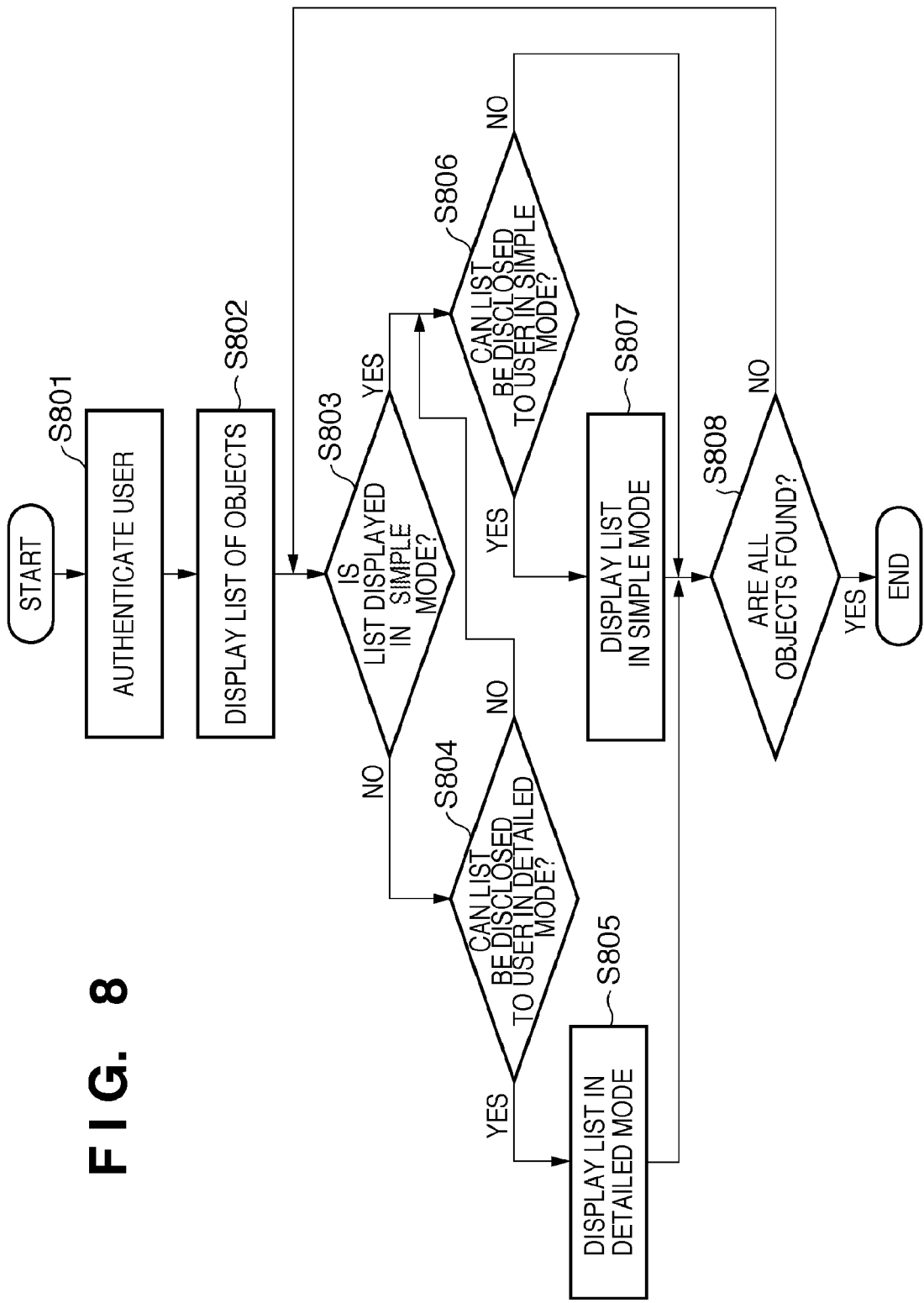
FIG. 8 is a flowchart showing the processing to be performed when objects whose disclosure ranges are set are to be displayed in the form of a list according to this embodiment.
Figure 9:
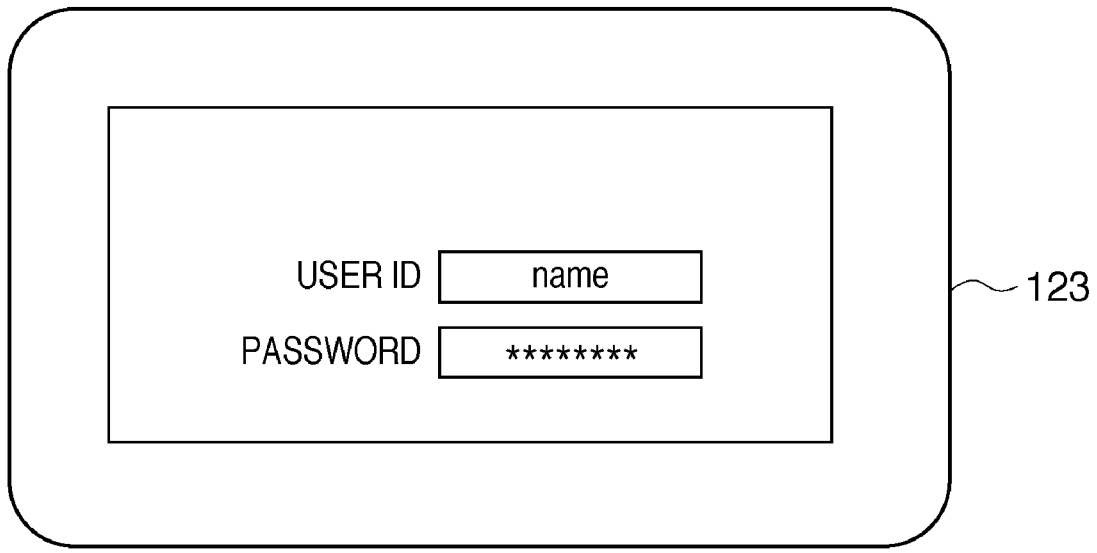
FIG. 9 is a view showing an example of the layout of a window for user authentication.

The processing to be performed when a user is to display a list of objects whose disclosure ranges are set will be described next. FIG. 8 is a flowchart showing the processing to be performed when objects whose disclosure ranges have been set are to be displayed in the form of a list according to this embodiment. First of all, in step S801, the display unit 123 or the display unit of the terminal 150 displays a login window for user authentication. FIG. 9 is a view showing an example of the layout of the window for user authentication. The user can input a user ID and a password as data to be authenticated on a login window like that shown in FIG. 8.

In step S802, the user displays the menu "display of object list" on the display unit 123 and selects "simple mode" or "detailed mode", as shown in FIG. 6A.

If it is determined in step S803 that the user has selected "simple mode", the process advances to step S806.

In step S806, the DMA 116 searches for the user ID of the user and object ID "0" stored in the hard disk 119, and refers to the field 412 of the packet data 400. In this case, if the user ID of the user is contained in the data of the disclosure range stored in the field 412, the object is stored in the display memory 122 and displayed on the display unit 123 in the simple mode (step S807).

If the user ID is not contained in the data of the disclosure range stored in the field 412, the process advances to step S808 without displaying the object. In step S808, the DMA 116 searches for next object ID "1", and the process returns to step S803. If it is determined in step S808 that all the objects are found, the processing is terminated.

In the above description, display processing is performed for each object (S807). However, objects can be stored in the display memory 122 in step S807, and all the objects can be displayed on the display unit 123 after step S808.

If it is determined in step S803 that the user has selected "detailed mode", the process advances to step S804. In step S804, the DMA 116 searches for the user ID of the user and object ID "0" stored in the hard disk 119, and refers to the field 412 of the packet data 400. If the user ID of the user is contained in the data of the disclosure range stored in the field 412, the object is displayed in the detailed mode (step S805). The process advances to step S808. If the user ID is not contained in the data of the disclosure range stored in the field 412, the process advances to step 806. The processing after step S806 is the same as that described above. That is, if a user cannot browse an object in the detailed mode, the image forming apparatus 10 checks whether the object can be displayed in the simple mode. If the object can be displayed in the simple mode, the object is displayed in the simple mode. If the object cannot be displayed in the simple mode, no object is displayed.

Figure 10:
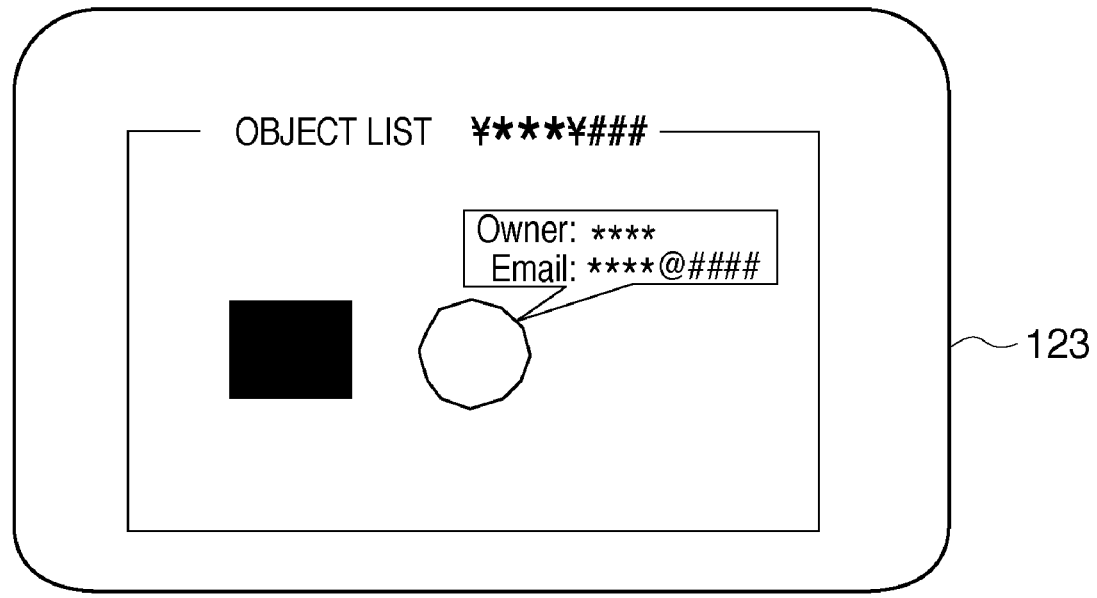
FIG. 10 is a view showing an example of how the owners of objects and contact address information of each owner are displayed by a simple mode.

In the above description, display processing is performed for each object (S805 and S807). However, it suffices to display all objects on the display unit 123 after step S808 as in the simple mode. In step S807, when objects are displayed in the simple mode, an object owner and contact address information can be displayed. FIG. 10 is a view showing an example of how the owner of an object displayed in the simple mode and contact address information are displayed. As shown in FIG. 10, the rectangular object is displayed in the detailed mode, and the circuit object is displayed in the simple mode. The circular object is displayed together with a balloon showing owner information and contact address information which is an electronic mail address. For example, the DMA 116 implements such processing by referring to the object owner information stored in the field 411 of the packet data 400. The user can obtain permission to disclose the object in the detailed mode by contacting the object owner in accordance with the owner name and contact address information displayed on the display unit 123. In addition, when the object owner changes the setting of the object disclosure range on a window like that shown in FIGS. 7A and 7B, the corresponding user can browse the object in the detailed mode.

Figure 11:
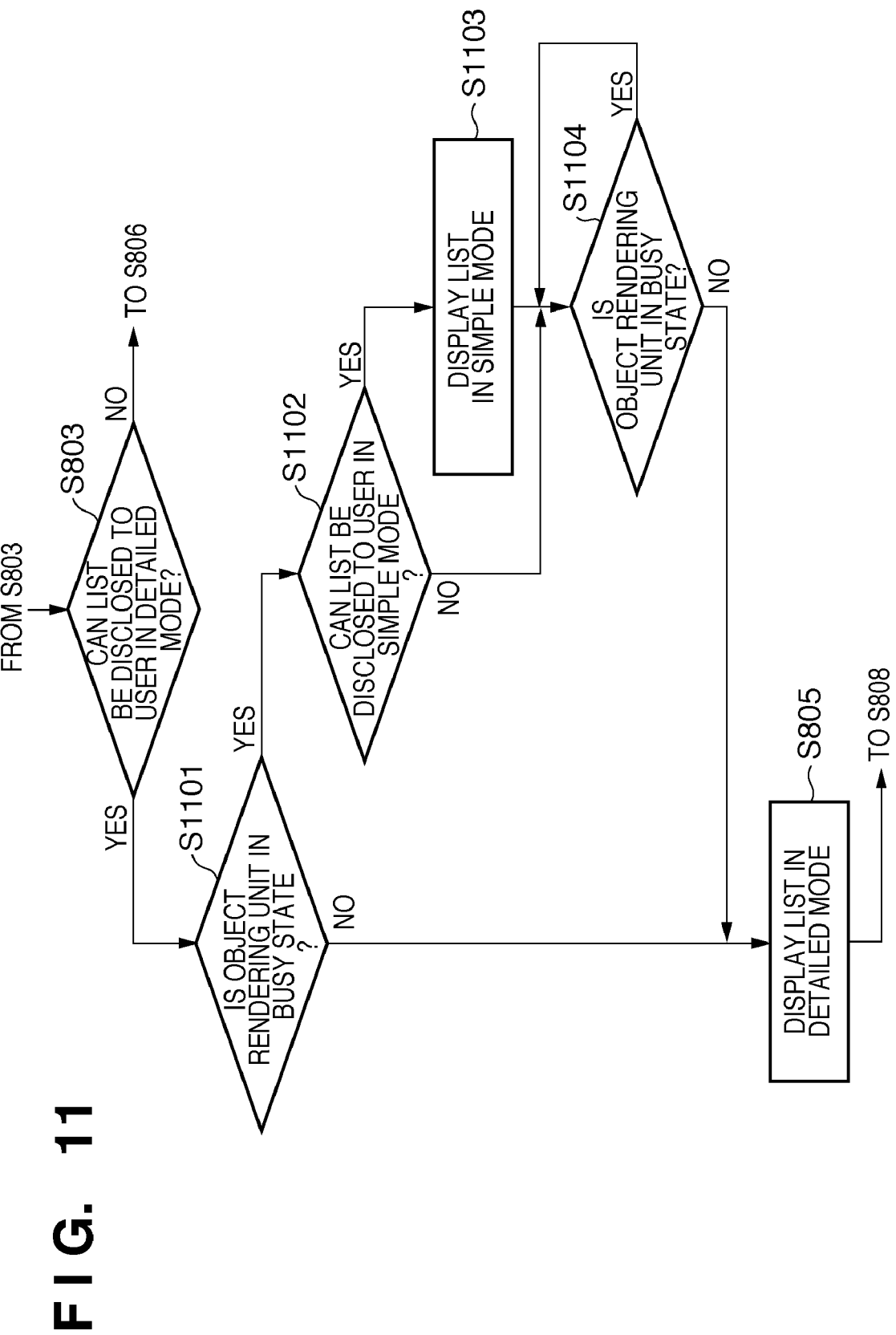
FIG. 11 is a flowchart additionally showing the processing of determining the busy state of an object rendering unit at the time of display in a detailed mode in FIG. 8.

If the user ID of a user is contained in the data of the disclosure range stored in the field 412 in step S804 in FIG. 8, the busy state of the object rendering unit 118 may be detected as described with reference to FIG. 5. FIG. 11 is a flowchart additionally showing the processing of determining the busy state of the object rendering unit when an object is displayed in the detailed mode in FIG. 8. If the object rendering unit 118 is not in the busy state, the object is displayed in the detailed mode in step S805. The process advances to step S808 to search for the next object. If the object rendering unit 118 is in the busy state, it is determined in step S1102 as in step S806 whether the object can be disclosed in the simple mode. If the object can be disclosed in the simple mode, the object is displayed in the simple mode (step S1103). The process advances to step S1104. If the object cannot be disclosed in the simple mode, nothing is displayed for the corresponding object, and the process advances to step S1104.

It is determined in step S1104 as in step S1101 whether the object rendering unit 118 is in the busy state.

If it is determined in step S1101 that the busy state of the object rendering unit 118 is released, the process advances to step S805 to display the object in the detailed mode.

In step S1103 or S1104 in FIG. 11, the display unit 123 displays the message "An object is currently used, and is displayed in the simple mode". In this case, it suffices to stop the processing in FIGS. 8 and 11 by operating the stop key 1242 or the like.

As described above, when scanning a sheet document and storing the resultant data as an object or generating a new object by using a registered object, the user can set a disclosure range in which the object can be browsed.

In addition, even a user who can browse an object only in the simple mode can issue a request to set the disclosure of the object in the detailed mode by contacting the object owner using the display shown in FIG. 10. In this case, when reading out an object stored in the hard disk 119 and storing it again, the object owner can perform resetting on a window like that shown in FIGS. 7A and 7B. Each user of the image forming apparatus 10 can therefore easily set the disclosure range of an object. This makes it unnecessary for the manager of the image forming apparatus 10 to manage and set information about the disclosure ranges of a plurality of objects. This makes it possible to reduce the load on the manager.

The present invention also includes a case in which the functions of the above embodiment are implemented when the operating system (OS) running on the computer performs part or all of actual processing based on the instructions of program codes (image processing program). The present invention is further applied to a case in which the program codes read out from the storage medium are written in the memory of a function expansion card inserted into the computer or a function expansion unit connected to the computer. In this case, for example, the CPU of the function expansion card or function expansion unit performs part or all of actual processing based on the instructions of the written program codes, thereby implementing the functions of the embodiment described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-157744, filed Jun. 14, 2007, which is hereby incorporated by reference herein in its entirety.

What is claimed is:

1. An image processing apparatus comprising:
a storage configured to store object data which contains image data of an object and contour line data of the object, wherein the object data is extracted from document image data;
a first conversion unit configured to convert the contour line data of the object to raster data;
a second conversion unit configured to convert the image data of the object to raster data;
a first determination unit configured to determine whether a display mode designated by a user is a simple display mode for displaying based on the contour line data or a detailed display mode for displaying based on the image data;
a second determination unit configured to determine whether the second conversion unit is in a busy state;
a display controller configured to cause a display unit (i) to display the raster data converted from the contour line data by the first conversion unit when the first determination unit determines that the display mode is a simple display mode, (ii) to display the raster data converted from the contour line data by the first conversion unit when the first determination unit determines that the display mode is the detailed display mode and the second determination unit determines that the second conversion unit is in a busy state, and (iii) to display the raster data converted from the image data by the second conversion unit when the first determination unit determines that the display mode is the detailed display mode and the second determination unit determines that the second conversion unit is not in a busy state.

2. The apparatus according to claim 1, further comprising:
a third determination unit configured to determine whether or not the user belongs to a disclosure range of the object in the simple display mode, based on a public information included in the object data, wherein the public information represents a disclosure range of the object in each of the simple display mode and the detailed display mode; and
a fourth determination unit configured to determine whether or not the user belongs to a disclosure range of users who are able to browse the object in the detailed display mode based on the public information, wherein the display controller is configured to cause the display unit (i-a) to display the raster data converted from the contour line data by the first conversion unit when the first determination unit determines that the display mode is the simple display mode and the third determination unit determines that the user belongs to the disclosure range of users who are able to browse the object in the simple display mode, (i-b) not to display the raster data converted by the first conversion unit when the first determination unit determines that the display mode is the simple display mode and the third determination unit determines that the user do not belong to the disclosure range of users who are able to browse the object in the simple display mode, (ii-a) to display the raster data converted from the contour line data by the first conversion unit when the first determination unit determines that the display mode is the detailed display mode and the fourth determination unit determines that the user belongs to the disclosure range of users who are able to browse the object in the detailed display mode and the second determination unit determines that the second conversion unit is in a busy state and the third determination unit determines that the user belongs to the disclosure range of users who are able to browse the object in the simple display mode, (ii-b) not to display the raster data converted by the first conversion unit when the first determination unit determines that the display mode is the detailed display mode and the fourth determination unit determines that the user belongs to the disclosure range of users who are able to browse the object in the detailed display mode and the second determination unit determines that the second conversion unit is in a busy state and the third determination unit determines that the user do not belong to the disclosure range of users who are able to browse the object in the simple display mode, (iii-a) to display the raster data converted from the image data by the second conversion unit when the first determination unit determines that the display mode is the detailed display mode and the fourth determination unit determines that the user belongs to the disclosure range of users who are able to browse the object in the detailed display mode and the second determination unit determines that the second conversion unit is not in a busy state.

3. The apparatus according to claim 2, wherein the disclosure range represented by the public information is set as a group of users.

4. The apparatus according to claim 1, wherein the display controller causes the display unit to display owner information of the object while causing the display unit to display based on the contour line data.

5. The apparatus according to claim 1, further comprising:
an image input unit which inputs the document image data from which the object data is to be extracted by the image processing apparatus; and
an output unit which outputs the object data stored by the image processing apparatus.

6. An image processing method executed in an image processing apparatus including a storage configured to store object data which contains image data of an object and contour line data of the object, wherein the object data is extracted from document image data, a first conversion unit configured to convert the contour line data to raster data and a second conversion unit configured to convert the image data to raster data, comprising:
a first determination step of determining whether a display mode designated by a user is a simple display mode for displaying based on the contour line data or a detailed display mode for displaying based on the image data;
a second determination step of determining whether the second conversion unit is in a busy state;
a display controlling step of causing a display unit (i) to display the raster data converted from the contour line data by the first conversion unit when, in the first determination step, it is determined that the display mode is a simple display mode, (ii) to display the raster data converted from the contour line data by the first conversion unit when it is determined in the first determination step that the display mode is the detailed display mode and it is determined in the second determination step that the second conversion unit is in a busy state, and (iii) to display the raster data converted from the image data by the second conversion unit when it is determined in the first determination step that the display mode is the detailed display mode and it is determined in the second determination step that the second conversion unit is not in a busy state.

7. A non-transitory computer-readable medium storing an image processing program which, when executed by a computer including a storage configured to store object data which contains image data of an object and contour line data of the object, wherein the object data is extracted from document image data, a first conversion unit configured to convert the contour line data to raster data and a second conversion unit configured to convert the image data to raster data, causes the computer to perform a method comprising the steps of:
determining whether a display mode designated by a user is a simple display mode for displaying based on the contour line data or a detailed display mode for displaying based on the image data;
determining whether the second conversion unit is in a busy state; and
causing a display unit (i) to display the raster data converted from the contour line data by the first conversion unit when it is determined that the display mode is a simple display mode, (ii) to display the raster data converted from the contour line data by the first conversion unit when it is determined that the display mode is the detailed display mode and it is determined that the second conversion unit is in a busy state, and (iii) to display the raster data converted from the image data by the second conversion unit when it is determined that the display mode is the detailed display mode and it is determined that the second conversion unit is not in a busy state.

* * * * *